(12) United States Patent
Sutardja

(10) Patent No.: US 8,031,424 B2
(45) Date of Patent: *Oct. 4, 2011

(54) METHOD AND APPARATUS FOR TESTING ELECTRONICS OF A STORAGE SYSTEM

(75) Inventor: Pantas Sutardja, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,249

(22) Filed: Jan. 11, 2010

(65) Prior Publication Data

US 2010/0110574 A1    May 6, 2010

Related U.S. Application Data

(63) Continuation of application No. 11/481,109, filed on Jul. 5, 2006, now Pat. No. 7,646,555.

(60) Provisional application No. 60/808,799, filed on May 26, 2006, provisional application No. 60/759,431, filed on Jan. 17, 2006.

(51) Int. Cl.
*G11B 5/09* (2006.01)

(52) U.S. Cl. ................. 360/51; 360/31; 360/46

(58) Field of Classification Search .......... None
See application file for complete search history.

(56) References Cited

U.S. PATENT DOCUMENTS

| | | |
|---|---|---|
| 5,479,098 A | 12/1995 | Yokoyama et al. |
| 6,397,042 B1 | 5/2002 | Prentice et al. |
| 6,657,953 B1 | 12/2003 | Hiramoto et al. |
| 7,099,278 B2 | 8/2006 | Momtaz |
| 7,439,729 B2 | 10/2008 | Azimi et al. |
| 7,477,467 B1 | 1/2009 | Sutardja |

OTHER PUBLICATIONS

Communication and extended European Search Report from the European Patent Office dated May 11, 2007 for Application No. 07 000 463.5-1247; 8 pages.

Matthes, Doug et al; "Technique for Testing a Very High Speed Mixed Signal Read Channel Design"; Proceedings International Test Conference; Oct. 30, 2000; pp. 965-970.

*Primary Examiner* — Jason Olson

(57) ABSTRACT

A system including a read channel device and a loopback circuit. The read channel device communicates with a hard disk controller module via a read bus and a write bus. The loopback circuit is configured to selectively loop back the write bus to the read bus. The read channel device is configured to generate a write clock for the hard disk controller module to write data on the write bus. The read channel device is configured to generate a read clock for the hard disk controller module to read the data on the read bus. The write clock is independent of the read clock.

20 Claims, 11 Drawing Sheets

METHOD AND APPARATUS FOR TESTING ELECTRONICS OF A STORAGE SYSTEM

CROSS-REFERENCE TO RELATED APPLICATIONS

This application is a continuation of U.S. patent application Ser. No. 11/481,109 (now U.S. Pat. No. 7,646,555), filed Jul. 5, 2006, which claims the benefit of U.S. Provisional Application No. 60/808,799, filed May 26, 2006 and U.S. Provisional Application No. 60/759,431, filed Jan. 17, 2006. The disclosures of the above applications are incorporated herein by reference in their entirety.

FIELD

The present disclosure relates to storage systems, and more particularly to testing electronic devices and subsystems in storage systems.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Host devices such as computers, laptops, servers, etc., typically store data on storage devices such as hard disk drives. Referring now to FIG. 1, an exemplary hard disk drive 10 is shown to include a hard disk drive (HDD) system 12 and a hard drive assembly (HDA) 13. The HDA 13 includes one or more circular recording surfaces 14. The recording surfaces 14 are coated with magnetic layers 15. Data is recorded on the recording surfaces 14 in the form of digital bits called ones and zeros.

A spindle motor, shown schematically at 16, rotates the recording surfaces 14. Generally, the spindle motor 16 rotates the recording surfaces 14 at a fixed speed during read/write operations. One or more read/write actuator arms 18 moves relative to the recording surfaces 14 to read and/or write data to/from the recording surfaces 14.

A read/write device 20 is located near a distal end of the read/write arm 18. The read/write device 20 includes a write element such as an inductor that generates a magnetic field. The read/write device 20 also includes a read element (such as a magneto-resistive (MR) element) that senses the magnetic field on the recording surfaces 14.

A preamp circuit 22 amplifies analog read/write signals. When reading data, the preamp circuit 22 amplifies low level signals from the read element and outputs the amplified signal to a read channel device 24. When writing data, a write current is generated which flows through the write element of the read/write device 20. The write current is switched to produce a magnetic field having a positive or negative polarity. The positive or negative polarity is stored on the recording surfaces 14 and is used to represent data.

The HDD 12 typically includes a buffer 32 that stores data that is associated with the control of the hard disk drive. Additionally, the buffer 32 buffers data that is read or that is to be written. The data thus buffered is then transmitted as data blocks to improve efficiency of reading and writing. The buffer 32 may employ DRAM, SDRAM, or other types of low latency memory. The HDD 12 further includes a processor 34 that performs processing related to the operation of the HDD 10.

The HDD 12 further includes a hard disk controller (HDC) 36 that communicates with a host device via an input/output (I/O) interface 38. The I/O interface 38 can be a serial or parallel interface, such as an Integrated Drive Electronics (IDE), Advanced Technology Attachment (ATA), or serial ATA (SATA) interface. The I/O interface 38 communicates with an I/O interface 44 that is associated with a host device 46.

The HDC 36 also communicates with a spindle/voice coil motor (VCM) driver 40 and/or the read channel device 24. The spindle/VCM driver 40 controls the spindle motor 16 that rotates the recording surfaces 14. The spindle/VCM driver 40 also generates control signals that position the read/write arm 18 using a voice coil actuator, a stepper motor, or any other suitable actuator.

Some electronic devices in the disk drives perform complex functions. For example, the read channel device 24 may incorporate an efficient data-encoding scheme in addition to advanced digital filtering and data-detection techniques. The read channel device 24 may thereby increase areal densities and data transfer rates of disk drives. Thus, testing devices such as the read channel device 24 may ensure data reliability.

Generally, external test equipment is used to test electronic devices such as the read channel device 24. Disk drives, however, are steadily decreasing in size and increasing in speed. This is because use of disk drives is proliferating in small electronic devices such as MP3 players, game consoles, digital cameras, etc. These devices typically use compact disk drives having high storage capacities and high data transfer rates. As a result, physical dimensions of disk drives are steadily shrinking. This makes using external test equipment increasingly impractical. Consequently, conventional test equipment may be unable to test complex devices and subsystems such as read channel devices, hard disk controllers, etc., in compact and high-speed disk drives.

SUMMARY

A system comprises a hard disk controller (HDC) module that controls a hard disk and a read channel (RC) device that communicates with the HDC module via a read bus and a write bus. The RC device includes a loopback circuit that selectively loops back the write bus to the read bus. The RC device generates a write clock for the HDC module to write data on the write bus and a read clock for the HDC module to read the data on the read bus, wherein the write clock is independent of the read clock.

In another feature, the RC device comprises a control module that activates the loopback circuit.

In another feature, the RC device generates the write clock based on a fixed RC timebase. The RC device generates a read clock based on a recovered channel clock.

In another feature, the RC device comprises a write clock generator module that generates the write clock by dividing one of a fixed RC timebase and a recovered channel clock. The RC device comprises a clock control module that disables stretching and rephasing features of the write clock generator module. The RC device comprises a clock control module that disables switching between the fixed RC timebase and the recovered channel clock after the write clock generator module selects one of the fixed RC timebase and the recovered channel clock to generate the write clock.

In another feature, the HDC module is fabricated on a first die and the RC device is fabricated on a second die.

In another feature, the HDC module and the RC device are fabricated on a common die.

In still other features, a system comprises a hard disk controller (HDC) module that controls a hard disk using a read bus and a write bus, a first-in first-out (FIFO) memory that buffers data on the read bus, and a read channel (RC) device that communicates with the HDC module via the read bus and the write bus. The RC device includes a loopback circuit that selectively loops back the write bus to the read bus. The RC device generates a loopback clock that clocks the FIFO memory when the write bus is looped back to the read bus.

In another feature, the HDC module reads an output of the FIFO memory generated by the loopback clock when the write bus is looped back to the read bus.

In another feature, the HDC module reads an output of the FIFO memory generated by a read-write clock when the write bus is not looped back to the read bus.

In another feature, the RC device comprises a read-write clock generator that generates a read-write clock for the HDC module to read data on the read bus and to write data on the write bus. The read-write clock generator generates the read-write clock based on a fixed RC timebase and a recovered channel clock. The read-write clock generator generates the read-write clock based on the fixed RC timebase when the HDC module writes data on the write bus. The read-write clock generator generates the read-write clock based on the recovered channel clock when the HDC module reads data from the read bus.

In another feature, the HDC module is fabricated on a first die and the RC device is fabricated on a second die.

In another feature, the HDC module and the RC device are fabricated on a common die.

In still other features, a method comprises selectively looping back a write bus to a read bus between a hard disk controller (HDC) module and a read channel (RC) device in a disk drive, generating a write clock for the HDC module to write data on the write bus, and generating a read clock for the HDC module to read the data on the read bus, wherein the write clock is independent of the read clock.

In another feature, the method further comprises generating the write clock based on a fixed RC timebase.

In another feature, the method further comprises generating a read clock based on a recovered channel clock.

In another feature, the method further comprises generating the write clock by dividing one of a fixed RC timebase and a recovered channel clock. The method further comprises disabling stretching and rephasing of the write clock. The method further comprises disabling switching between the fixed RC timebase and the recovered channel clock after selecting one of the fixed RC timebase and the recovered channel clock to generate the write clock.

In still other features, a method comprises selectively looping back a write bus to a read bus between a hard disk controller (HDC) module and a read channel (RC) device in a disk drive, buffering data on the read bus using a first-in first-out (FIFO) memory, and generating a loopback clock for clocking the FIFO memory when the write bus is looped back to the read bus.

In another feature, the method further comprises reading an output of the FIFO memory that is generated by the loopback clock when the write bus is looped back to the read bus.

In another feature, the method further comprises reading an output of the FIFO memory that is generated by a read-write clock when the write bus is not looped back to the read bus.

In another feature, the method further comprises generating a read-write clock for the HDC module to read data on the read bus and to write data on the write bus. The method further comprises generating the read-write clock based on a fixed RC timebase and a recovered channel clock. The method further comprises generating the read-write clock based on the fixed RC timebase when the HDC module writes data on the write bus. The method further comprises generating the read-write clock based on the recovered channel clock when the HDC module reads data from the read bus.

In still other features, a system comprises hard disk controller (HDC) means for controlling a hard disk, and read channel (RC) means for communicating with the HDC means via a read bus and a write bus, selectively looping back the write bus to the read bus using a loopback means, generating a write clock for the HDC means to write data on the write bus, and generating a read clock for the HDC means to read the data on the read bus, wherein the write clock is independent of the read clock.

In another feature, the RC means comprises control means for activating the loopback means.

In another feature, the RC means generates the write clock based on a fixed RC timebase.

In another feature, the RC means generates a read clock based on a recovered channel clock.

In another feature, the RC means comprises write clock generator means for generating the write clock by dividing one of a fixed RC timebase and a recovered channel clock. The RC means comprises clock control means for disabling stretching and rephasing features of the write clock generator means. The RC means comprises clock control means for disabling switching between the fixed RC timebase and the recovered channel clock after the write clock generator means selects one of the fixed RC timebase and the recovered channel clock to generate the write clock.

In another feature, the HDC means is fabricated on a first die and the RC means is fabricated on a second die.

In another feature, the HDC means and the RC means are fabricated on a common die.

In still other features, a system comprises hard disk controller (HDC) means for controlling a hard disk using a read bus and a write bus, first-in first-out (FIFO) memory means for buffering data on the read bus, and read channel (RC) means for communicating with the HDC means via the read bus and the write bus, selectively looping back the write bus to the read bus using loopback means, and generating a loopback clock for clocking the FIFO memory means when the write bus is looped back to the read bus.

In another feature, the HDC means reads an output of the FIFO memory means that is generated by the loopback clock when the write bus is looped back to the read bus.

In another feature, the HDC means reads an output of the FIFO memory means that is generated by a read-write clock when the write bus is not looped back to the read bus.

In another feature, the RC means comprises read-write clock generator means for generating a read-write clock for the HDC means to read data on the read bus and to write data on the write bus. The read-write clock generator means generates the read-write clock based on a fixed RC timebase and a recovered channel clock. The read-write clock generator means generates the read-write clock based on the fixed RC timebase when the HDC means writes data on the write bus. The read-write clock generator means generates the read-write clock based on the recovered channel clock when the HDC means reads data from the read bus.

In another feature, the HDC means is fabricated on a first die and the RC means is fabricated on a second die.

In another feature, the HDC means and the RC means are fabricated on a common die.

In still other features, a computer program executed by a processor comprises selectively looping back a write bus to a read bus between a hard disk controller (HDC) module and a read channel (RC) device in a disk drive, generating a write clock for the HDC module to write data on the write bus, and generating a read clock for the HDC module to read the data on the read bus, wherein the write clock is independent of the read clock.

In another feature, the computer program further comprises generating the write clock based on a fixed RC timebase.

In another feature, the computer program further comprises generating a read clock based on a recovered channel clock.

In another feature, the computer program further comprises generating the write clock by dividing one of a fixed RC timebase and a recovered channel clock. The computer program further comprises disabling stretching and rephasing of the write clock. The computer program further comprises disabling switching between the fixed RC timebase and the recovered channel clock after selecting one of the fixed RC timebase and the recovered channel clock to generate the write clock.

In still other features, a computer program executed by a processor comprises selectively looping back a write bus to a read bus between a hard disk controller (HDC) module and a read channel (RC) device in a disk drive, buffering data on the read bus using a first-in first-out (FIFO) memory, and generating a loopback clock for clocking the FIFO memory when the write bus is looped back to the read bus.

In another feature, the computer program further comprises reading an output of the FIFO memory that is generated by the loopback clock when the write bus is looped back to the read bus.

In another feature, the computer program further comprises reading an output of the FIFO memory that is generated by a read-write clock when the write bus is not looped back to the read bus.

In another feature, the computer program further comprises generating a read-write clock for the HDC module to read data on the read bus and to write data on the write bus. The computer program further comprises generating the read-write clock based on a fixed RC timebase and a recovered channel clock. The computer program further comprises generating the read-write clock based on the fixed RC timebase when the HDC module writes data on the write bus. The computer program further comprises generating the read-write clock based on the recovered channel clock when the HDC module reads data from the read bus.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
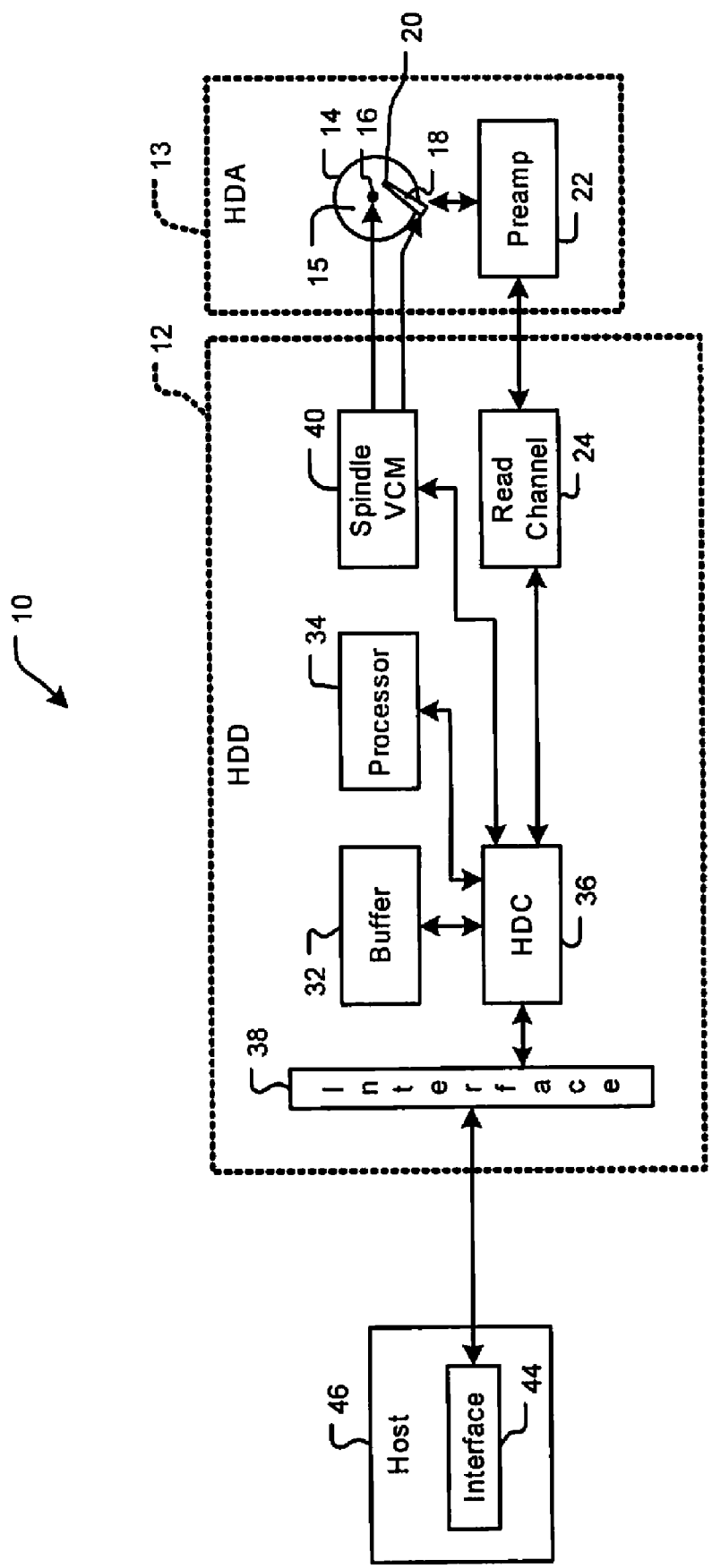
FIG. 1 is a functional block diagram of an exemplary hard disk drive according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Self-tests using loopbacks can verify system operation without using external test equipment. In loopback tests, a loopback circuit typically loops back outputs of an output driver of a device to inputs of an input driver of the device. If data written matches data read back, the device and associated datapaths are considered to be functioning normally. Otherwise, a malfunction is detected.

Loopbacks can be incorporated in disk drives to perform self-tests. Loopbacks may be used instead of conventional test equipment to test electronic devices and subsystems in disk drives. Loopbacks may be preferable to external test equipment when disk drives are compact in size, high in storage capacity, and have high throughput or data transfer rates.

Figure 2A:
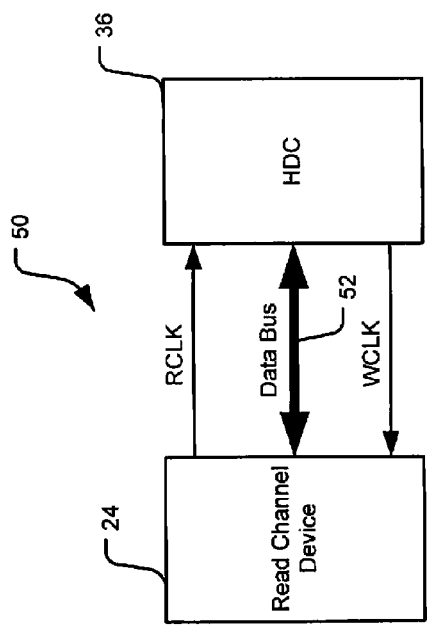
FIG. 2A is a functional block diagram of an exemplary interface between a read channel device and a hard disk controller module in a hard disk drive.
Figure 2B:
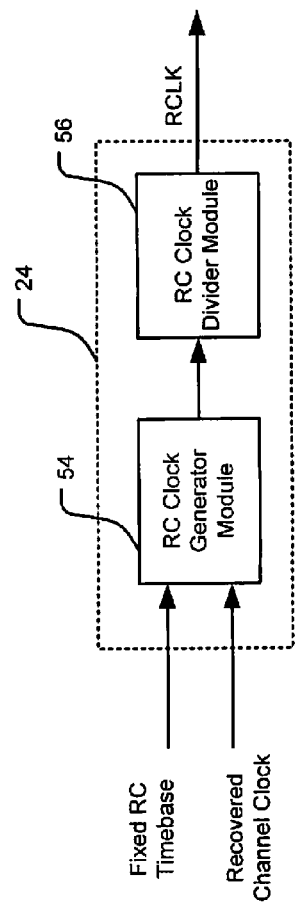
FIG. 2B is a functional block diagram of an exemplary clock generator used in a read channel device to generate a read-write clock.

Referring now to FIGS. 2A-2B, an interface 50 between a read channel (RC) device 24 and a hard disk controller (HDC) module 36 of a disk drive comprises a data bus 52, a read/write clock (RCLK), and a return read/write clock (WCLK). The data bus 52 comprises read datapaths and write datapaths. The HDC module 36 communicates with the RC device 24 via data bus 52. Specifically, the HDC module 36 reads and writes data via data bus 52 using RCLK generated by the RC device 24.

As shown in FIG. 2B, the RC device 24 comprises a RC clock generator module 54 and a RC clock divider module 56. The RC device 24 generates RCLK during normal operation as follows. When the HDC module 36 writes data, the clock generator module 54 generates a clock signal based on a fixed RC timebase. This is because write datapaths typically use a clock of a constant periodicity to write data at a constant bit rate. On the other hand, when the HDC module 36 reads data, the clock generator module 54 generates the clock signal based on a recovered channel clock. The divider module 56 divides the clock signal generated by the RC clock generator module 54 to generate RCLK.

Switching between fixed RC timebase while writing and recovered channel clock while reading may alter periodicity of RCLK. Additionally, when reading data, the periodicity of RCLK may be altered due to a zero-phase-restart (ZPS) and/or a rephasing of RCLK. ZPS occurs during initial channel synchronization. Rephasing of RCLK may occur when a sync-mark is detected.

Irregularities in the periodicity of RCLK are not problematic in normal read/write operations since normal read/write operations are not performed simultaneously. During loopback tests, however, read and write operations are performed simultaneously. That is, read and write datapaths are clocked simultaneously during loopback tests. If RCLK is used to write data during loopback tests, data read back may differ from data written due to irregularities in RCLK rather than due to a fault. Therefore, RCLK cannot be used to write data during loopback tests. Specifically, the clock for write datapaths may not have irregularities even if the clock for read datapaths does.

The present disclosure discloses various schemes for enabling loopback tests by generating a write clock of a constant periodicity for write datapaths. Specifically, a RC device generates a write clock of a constant periodicity for write datapaths in addition to generating a read clock for read datapaths. The write clock does not stretch and/or rephase during ZPS and/or synchronization of the read clock of read datapaths during a read operation. Thus, a HDC module writes data at a constant rate using the write clock even when the read clock performs timing synchronization, etc.

Figure 3:
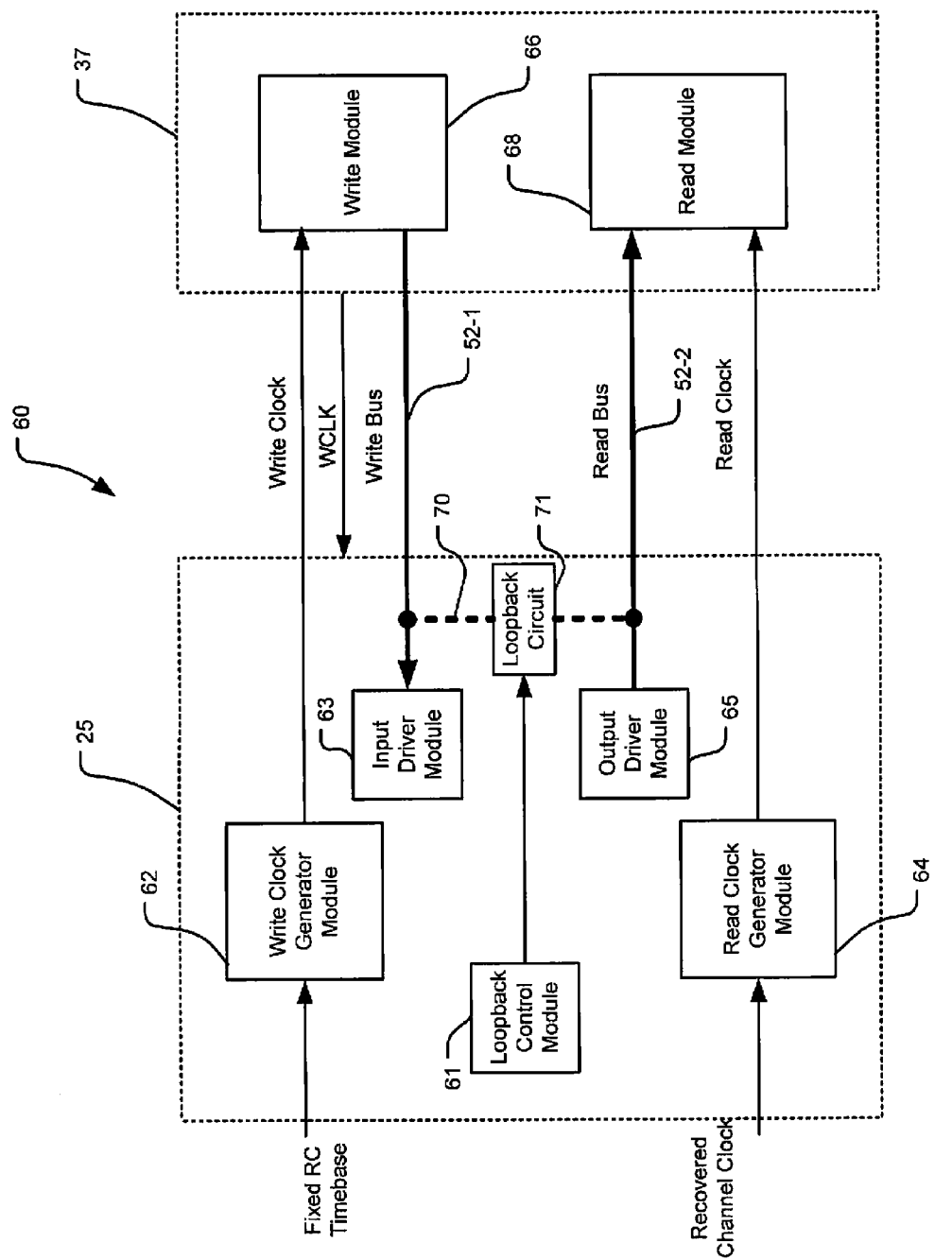
FIG. 3 is a functional block diagram of an exemplary system for performing loopback tests in a hard disk drive according to the present disclosure.

Referring now to FIG. 3, a system 60 for performing loopback tests in a disk drive comprises a RC device 25 and a HDC module 37. The HDC module 37 writes data on write datapaths (write bus) 52-1 and reads data from datapaths (read bus) 52-2. The write datapaths 52-1 are clocked by a write clock generated by the RC device 25. The read datapaths 52-2 are clocked by a read clock generated by the RC device. The write clock has a constant periodicity even if the read clock may stretch and/or rephase.

The RC device 25 comprises a loopback control module 61, an input driver module 63, an output driver module 65, a loopback circuit 71, a write clock generator module 62, and a read clock generator module 64. When performing loopback tests, the loopback control module 61 activates the loopback circuit 71. The loopback circuit 71 effectuates a loopback 70 and loops back the write bus 52-1 to the read bus 52-2. Specifically, the loopback circuit loops back outputs of the output driver module 65 to inputs of the input driver module 63. Alternatively, the loopback 70 may be effectuated by an external loopback or a test module (both not shown).

The write clock generator module 62 generates the write clock using a fixed RC timebase. The read clock generator module 64 generates the read clock using a recovered channel clock. The HDC module 37 comprises a write module 66 that writes data on the write bus 52-1 using the write clock. The HDC module 37 comprises a read module 68 that reads data from the read bus 52-2 using the read clock.

Figure 4A:
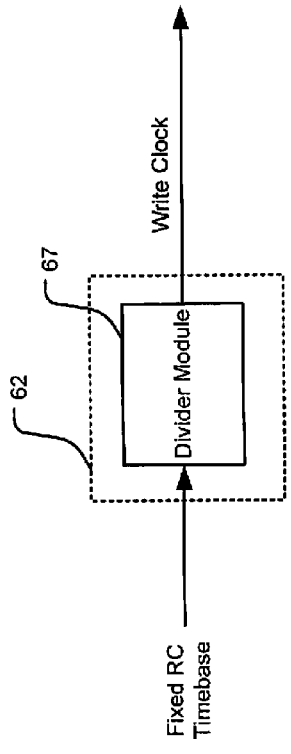
FIG. 4A is a functional block diagram of an exemplary write clock generator according to the present disclosure.
Figure 4B:
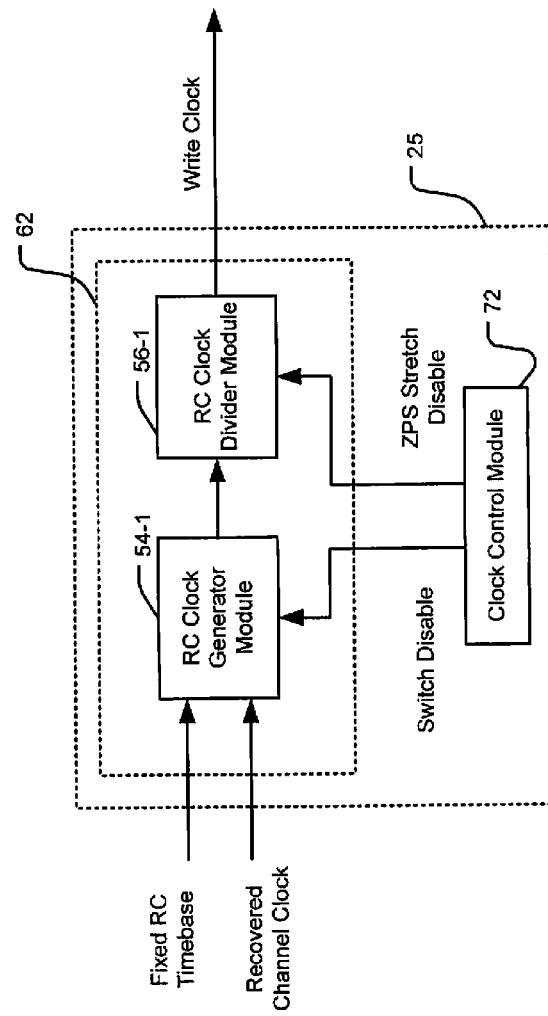
FIG. 4B is a functional block diagram of an exemplary write clock generator according to the present disclosure.

Referring now to FIGS. 4A-4B, the write clock generator module 62 may generate the write clock of a constant periodicity in many ways. In one way, the write clock generator module 62 comprises a divider module 67 that divides the fixed RC timebase to generate the write clock as shown in FIG. 4A. In another way, the write clock generator module 62 comprises a RC clock generator module 54-1, a RC clock divider module 56-1, and a clock control module 72 as shown in FIG. 4B.

The RC clock generator module 54-1 receives the fixed RC timebase and the recovered channel clock as sources for generating the write clock. The clock control module 72 disables a source switching feature of the RC clock generator module 54-1. Thus, the RC clock generator module 54-1 may use the fixed RC timebase or the recovered channel clock as a source for generating the write clock. Once the source is selected, however, the RC clock generator module 54-1 may not switch the source. Additionally, the clock control module 72 disables ZPS clock stretching and rephasing features of the RC clock divider module 56-1. Thus, the write clock generated by the write clock generator module 62 has a constant periodicity.

Alternatively, data may be read back during loopback tests using a clock of a constant periodicity. Specifically, a dataflow synchronization circuit such as a first-in first-out (FIFO) memory is used in read datapaths. The FIFO memory is clocked with a clock of a constant periodicity during loopback tests. Thus, the FIFO memory can transfer data from one clock domain such as RCLK that may have irregular periodicity to another clock domain having a constant periodicity.

Figure 5:
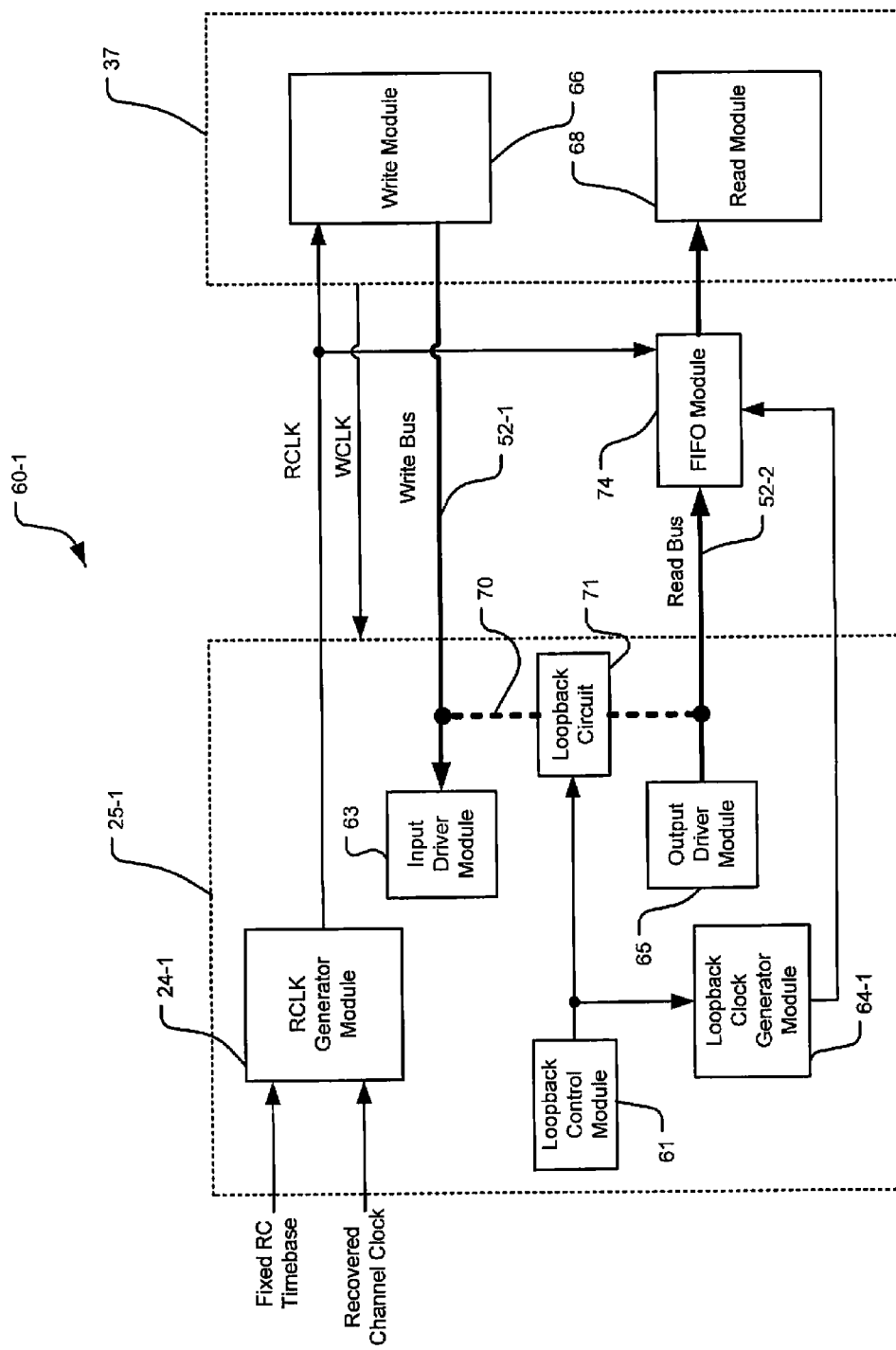
FIG. 5 is a functional block diagram of an exemplary system for performing loopback tests in a hard disk drive according to the present disclosure.

Referring now to FIG. 5, a system 60-1 for performing loopback tests in a disk drive comprises a RC device 25-1, a HDC module 37, and a first-in first-out (FIFO) memory 74. The HDC module 37 writes data on write datapaths (write bus) 52-1 and reads data from read datapaths (read bus) 52-2. The RC device 25-1 comprises a RCLK generator module 24-1, a loopback control module 61, a loopback clock generator module 64-1, an input driver module 63, an output driver module 65, and a loopback circuit 71.

The FIFO memory 74 is a data-flow synchronization circuit that is used in read datapaths 52-2. The FIFO memory 74 is normally clocked by RCLK. The HDC module 37 reads an output of the FIFO memory 74 that is clocked by RCLK when reading data during normal operation. During loopback tests, however, the FIFO memory 74 is clocked by a loopback clock. The HDC module 37 reads an output of the FIFO memory 74 that is clocked by the loopback clock when reading back data during loopback tests.

The RCLK generator module 24-1 generates RCLK that the HDC module 37 uses to write data on write datapaths 52-1 and to read data on read datapaths 52-2. The loopback clock generator module 64-1 generates the loopback clock of a constant periodicity that is used to clock the FIFO memory 74 during loopback tests.

When performing loopback tests, the loopback control module 61 activates the loopback circuit 71. The loopback circuit 71 effectuates a loopback 70 and loops back the write bus 52-1 to the read bus 52-2. Specifically, the loopback circuit 71 loops back outputs of the output driver module 65 to inputs of the input driver module 63. Alternatively, the loopback 70 may be effectuated by an external loopback or a test module (not shown).

The loopback control module 76 activates the loopback clock generator module 64-1. The loopback clock generator module 64-1 generates the loopback clock of a constant periodicity that clocks the FIFO memory 74. The FIFO memory 74 transfers data from one clock domain such as RCLK that may have irregular periodicity to another clock domain that has a constant periodicity.

In some implementations of systems 60 and 60-1, the RC device and the HDC module may be fabricated on separate dies. In some other implementations of systems 60 and 60-1, the RC device and the HDC module may be fabricated on a common die.

Figure 6:
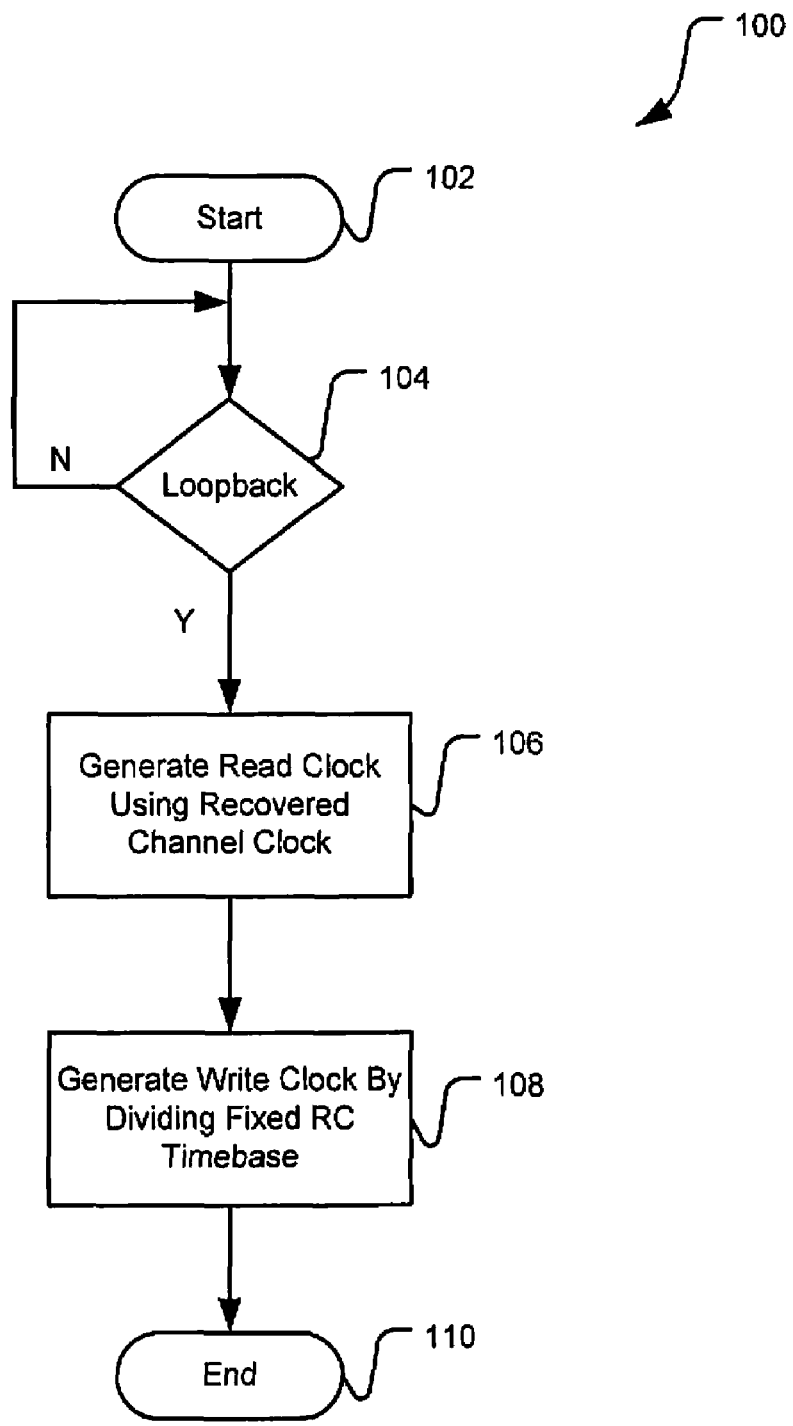
FIG. 6 is a flowchart of an exemplary method for performing loopback tests in a hard disk drive according to the present disclosure.

Referring now to FIG. 6, a method 100 for performing self-tests using loopback begins at step 102. If loopback is not enabled in step 104, the method 100 returns to step 102. Otherwise, a RC read clock generator module 64 generates a read clock in step 106 using a recovered channel clock. A write clock generator module 62 generates a write clock in step 108 by dividing a fixed RC timebase. The method 100 ends in step 110.

Figure 7:
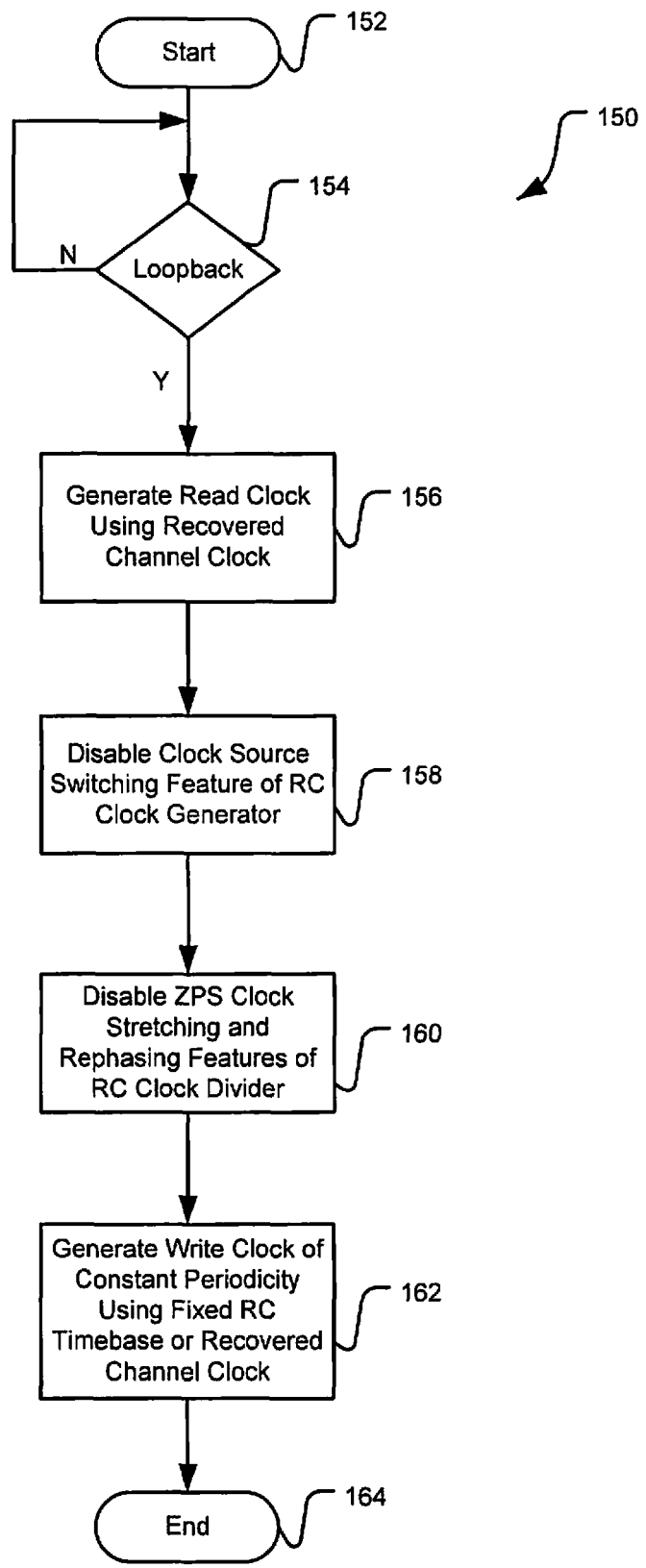
FIG. 7 is a flowchart of an exemplary method for performing loopback tests in a hard disk drive according to the present disclosure.

Referring now to FIG. 7, a method 150 for performing self-tests using loopback begins at step 152. If loopback is not enabled in step 104, the method 150 returns to step 152. Otherwise, a RC read clock generator module 64 generates a read clock in step 156 using a recovered channel clock. A control module 72 disables a clock source switching feature of a RC clock generator module 54-1 in step 158. The control module 72 disables ZPS clock stretching and rephasing features of a RC clock divider module 56-1 in step 160. The write clock generator module 62 generates a write clock of a constant periodicity in step 162 using a fixed RC timebase or a recovered channel clock. The method 150 ends in step 164.

Figure 8:
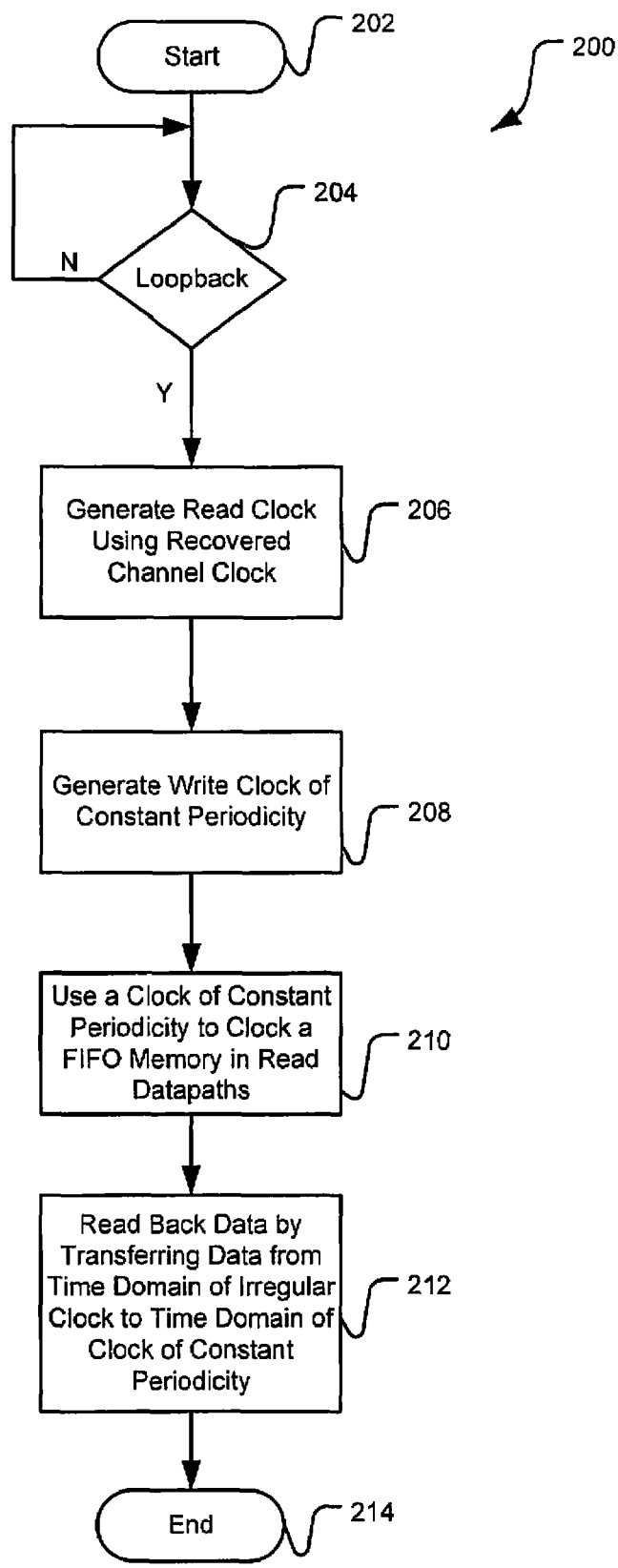
FIG. 8 is a flowchart of an exemplary method for performing loopback tests in a hard disk drive according to the present disclosure.

Referring now to FIG. 8, a method 200 for performing self-tests using loopback begins at step 202. If loopback is not enabled in step 204, the method 200 returns to step 202. Otherwise, a RC read clock generator module 64 generates a read clock in step 206 using a recovered channel clock. The write clock generator module generates a write clock of a constant periodicity in step 208.

A loopback control module 76 uses a clock of a constant periodicity such as the write clock to clock a FIFO memory 72 in read datapaths 52-2 in step 210. The FIFO memory 72 transfers data from a clock domain having an irregular clock such as the read clock to a time domain having a constant periodicity in step 212. The method 200 ends in step 214.

Figures 9A, 9B:
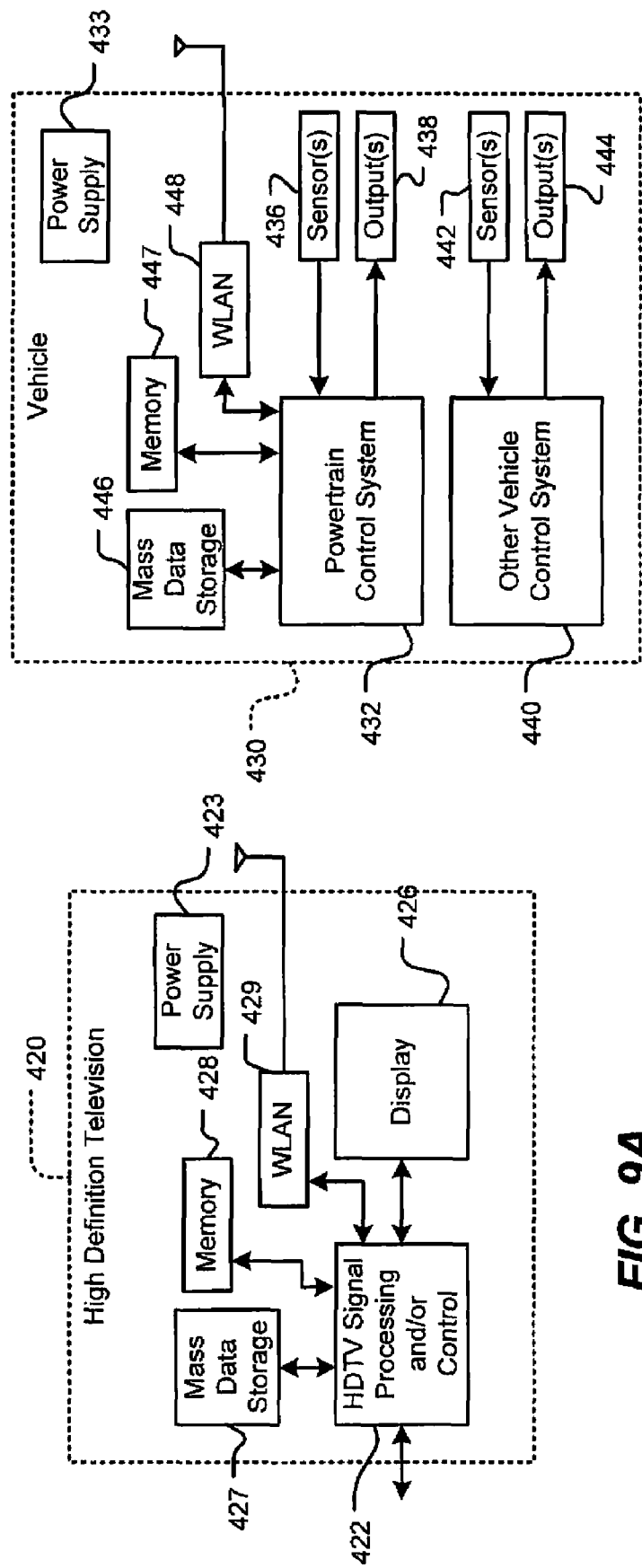
FIG. 9A is a functional block diagram of a high definition television.
FIG. 9B is a functional block diagram of a vehicle control system.

Referring now to FIGS. 9A-9E, various exemplary implementations of the system 60 and the system 60-1 (collectively system 60) are shown. Referring now to FIG. 9A, the system 60 can be implemented in a mass data storage 427 of a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with the mass data storage 427 that stores data in a nonvolatile manner such as optical and/or magnetic storage devices. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 9B, the system 60 may be implemented in a mass data storage 446 of a vehicle control system 430. In some implementations, a powertrain control system 432 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with the mass data storage 446 that stores data in a nonvolatile manner. The mass data storage 446 may include optical and/or magnetic storage devices such as hard disk drives HDD and/or DVDs. The system 60 may be implemented in at least one HDD. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 9C:
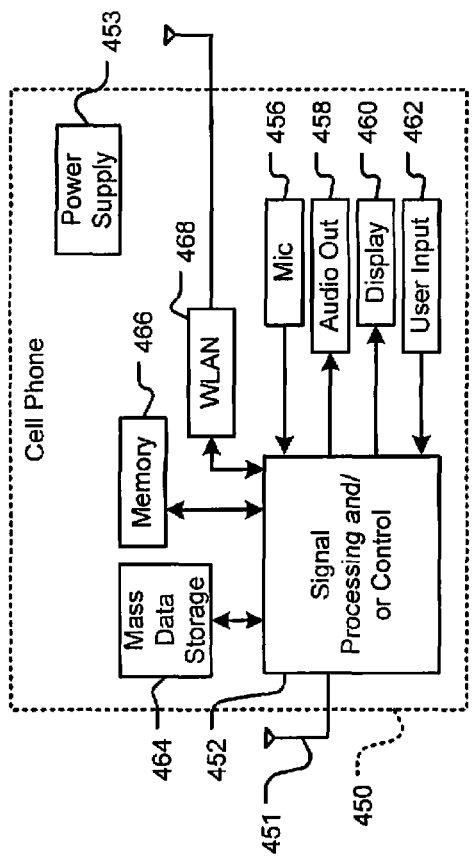
FIG. 9C is a functional block diagram of a cellular phone.

Referring now to FIG. 9C, the system 60 can be implemented in a mass data storage 464 of a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with the mass data storage 464 that stores data in a nonvolatile manner such as optical and/or magnetic storage devices for example hard disk drives HDD and/or DVDs. The system 60 may be implemented in at least one HDD. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 9D:
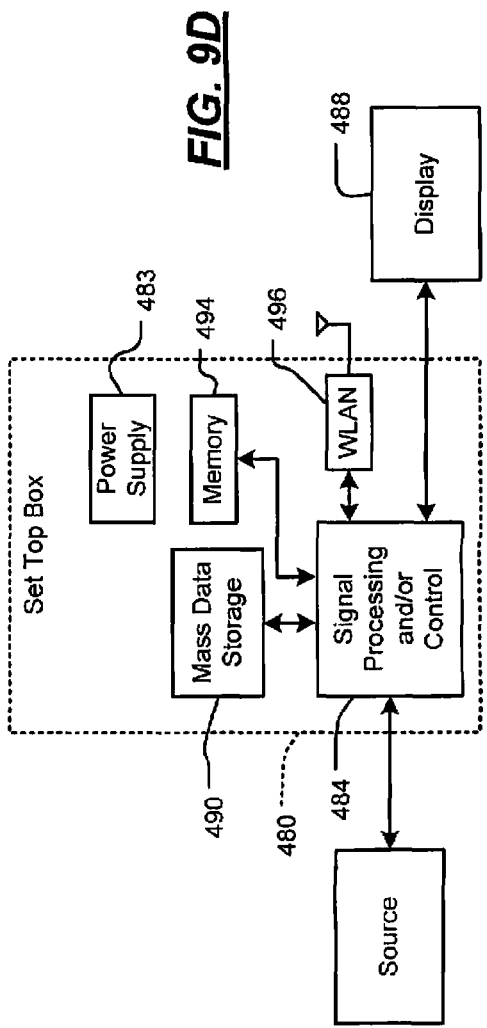
FIG. 9D is a functional block diagram of a set top box.

Referring now to FIG. 9D, the system 60 can be implemented in a mass data storage 490 of a set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with the mass data storage 490 that stores data in a nonvolatile manner. The mass data storage 490 may include optical and/or magnetic storage devices for example hard disk drives HDD and/or DVDs. The system 60 may be implemented in at least one HDD. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 9E:
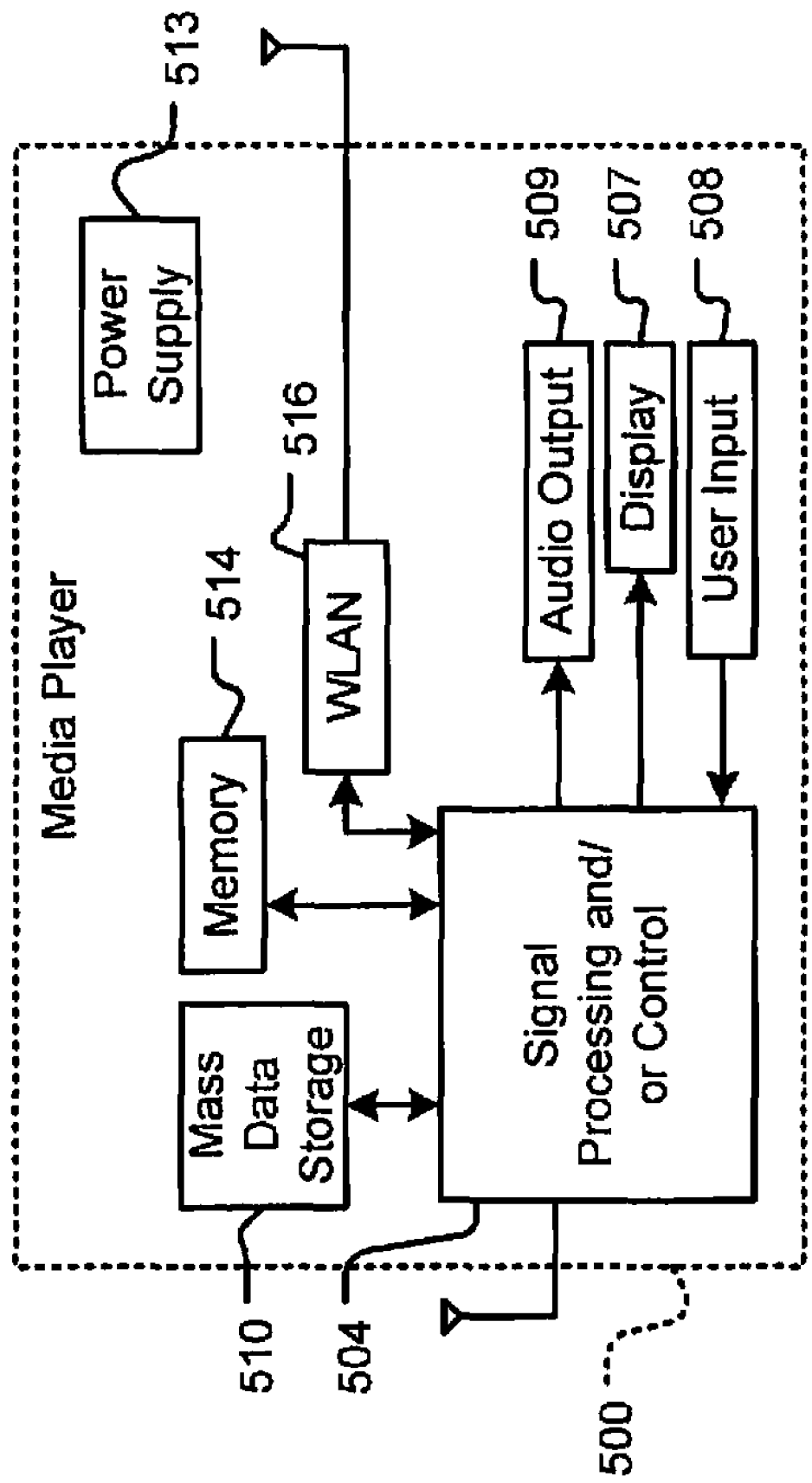
FIG. 9E is a functional block diagram of a media player.

Referring now to FIG. 9E, the system 60 can be implemented in a mass data storage 510 of a media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with the mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices for example hard disk drives HDD and/or DVDs. The system 60 may be implemented in at least one HDD. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
   a read channel device in communication with a hard disk controller module via a read bus and a write bus; and
   a loopback circuit configured to selectively loop back the write bus to the read bus,
   wherein the read channel device is configured to
      generate a write clock for the hard disk controller module to write data on the write bus, and
      generate a read clock for the hard disk controller module to read the data on the read bus,
      wherein the write clock is independent of the read clock.

2. The system of claim 1, wherein the read channel device comprises a control module configured to activate the loopback circuit.

3. The system of claim 1, wherein the read channel device is configured to generate the write clock based on a fixed timebase.

4. The system of claim 1, wherein the read channel device is configured to generate the read clock based on a recovered channel clock.

5. The system of claim 1, wherein the read channel device comprises a write clock generator module configured to generate the write clock by dividing a fixed timebase or dividing a recovered channel clock.

6. The system of claim 5, wherein the read channel device comprises a clock control module configured to disable stretching and rephasing features of the write clock generator module.

7. The system of claim 5, wherein the read channel device comprises a clock control module configured to disable switching between the fixed timebase and the recovered channel clock subsequent to the write clock generator module selecting the fixed timebase or the recovered channel clock to generate the write clock.

8. The system of claim 1, wherein:
   the hard disk controller module is fabricated on a first die; and
   the read channel device is fabricated on a second die.

9. The system of claim 1, wherein the hard disk controller module and the read channel device are fabricated on a common die.

10. The system of claim 1, wherein the read channel device includes the loopback circuit.

11. A system comprising:
    a first clock generator module configured to generate a first clock,
       wherein the first clock is used to transmit data from a hard disk controller module of a disk drive to a read channel device of the disk drive via a first bus; and
    a second clock generator module configured to generate a second clock,
       wherein the second clock is used to receive the data at the hard disk controller module via a second bus in response to the second bus being looped back to the first bus,
       wherein the second bus outputs data read by the read channel device from the disk drive to the hard disk controller module when the second bus is not looped back to the first bus, and
       wherein the first clock is independent of the second clock.

12. The system of claim 11, further comprising:
    the read channel device,
    wherein the read channel device includes
       the first clock generator module;
       the second clock generator module; and
       a loopback circuit configured to loop back the second bus to the first bus.

13. The system of claim 12, further comprising the hard disk controller module configured to:
    write the data on the first bus using the first clock in response to the second bus being looped back to the first bus; and
    read the data on the second bus using the second clock in response to the second bus being looped back to the first bus.

14. The system of claim 11, wherein:
the first clock generator module is configured to generate the first clock based on a fixed timebase; and
the second clock generator module is configured to generate the second clock based on a recovered channel clock.

15. The system of claim 11, wherein the first clock generator module is configured to generate the first clock based on a fixed timebase or a recovered channel clock, the system further comprising:
a clock control module configured to
select the fixed timebase or the recovered channel clock to generate the first clock,
disable switching between the fixed timebase and the recovered channel clock after selecting the fixed timebase or the recovered channel clock to generate the first clock, and
disable stretching and rephasing features of the first clock generator module.

16. The system of claim 11, further comprising:
the hard disk controller module, wherein the hard disk controller module is fabricated on a first die; and
the read channel device, wherein the read channel device is fabricated on a second die.

17. The system of claim 11, further comprising:
the hard disk controller module; and
the read channel device,
wherein the hard disk controller module and the read channel device are fabricated on a single die.

18. A system comprising:
a read channel device configured to (i) receive data from a hard disk controller module via a first bus and (ii) transmit data to the hard disk controller module via a second bus;
a loopback circuit configured to (i) loop back the first bus to the second bus during a first mode and (ii) not loop back the first bus to the second bus during a second mode; and
a first-in first-out module configured to
receive data via the second bus from (i) the loopback circuit during the first mode and (ii) the read channel device during the second mode, and
output the data received via the second bus to the hard disk controller module via the second bus based on (i) a first clock during the first mode and (ii) a second clock during the second mode,
wherein the first clock is different than the second clock.

19. The system of claim 18, further comprising the hard disk controller module configured to transmit data on the first bus using the second clock.

20. The system of claim 18, wherein the read channel device comprises:
a first clock generator module configured to generate the first clock;
a second clock generator module configured to generate the second clock; and
the loopback circuit.

* * * * *